United States Patent [19]

Schluter

[11] 4,147,383
[45] Apr. 3, 1979

[54] PIPE COUPLING

[76] Inventor: James C. Schluter, c/o Armco Steel Corporation, 703 Curtis St., Middletown, Ohio

[21] Appl. No.: 867,309

[22] Filed: Jan. 6, 1978

[51] Int. Cl.² ............................................. F16L 21/06
[52] U.S. Cl. ..................................... 285/373; 285/421
[58] Field of Search ................ 285/112, 373, 421, 419

[56] References Cited
U.S. PATENT DOCUMENTS

| | | | |
|---|---|---|---|
| 1,194,209 | 8/1916 | Middaugh | 285/421 X |
| 1,967,467 | 7/1934 | Damsel | 285/112 X |
| 2,760,792 | 8/1956 | Fons | 285/421 X |
| 2,843,153 | 7/1958 | Young | 285/112 X |
| 3,048,427 | 8/1962 | Mahoff et al. | 285/373 X |
| 3,212,797 | 10/1965 | Osweiler | 285/288 X |
| 3,756,629 | 9/1973 | Gibb | 285/112 |
| 3,966,237 | 6/1976 | Thiessen | 285/112 |

FOREIGN PATENT DOCUMENTS 2321315 3/1975 Fed. Rep. of Germany ........... 285/373
999415 10/1951 France ..................................... 285/421

Primary Examiner—Thomas F. Callaghan

[57] ABSTRACT

The pipe coupling includes coupling means overlying and engaging pipe end retainer rings on the juxtaposed ends of two lengths of pipe to be joined. The coupling means includes a band of generally U-shaped cross section having a wide base portion and in-turned legs. A gasket is positioned so as to form a seal between the retainer rings and the band. The free ends of the band are adapted to butt together, and means are provided to secure the free ends of the band together and to tighten the coupling means about the pipe end retainer rings so as to provide a leak tight joint.

10 Claims, 10 Drawing Figures

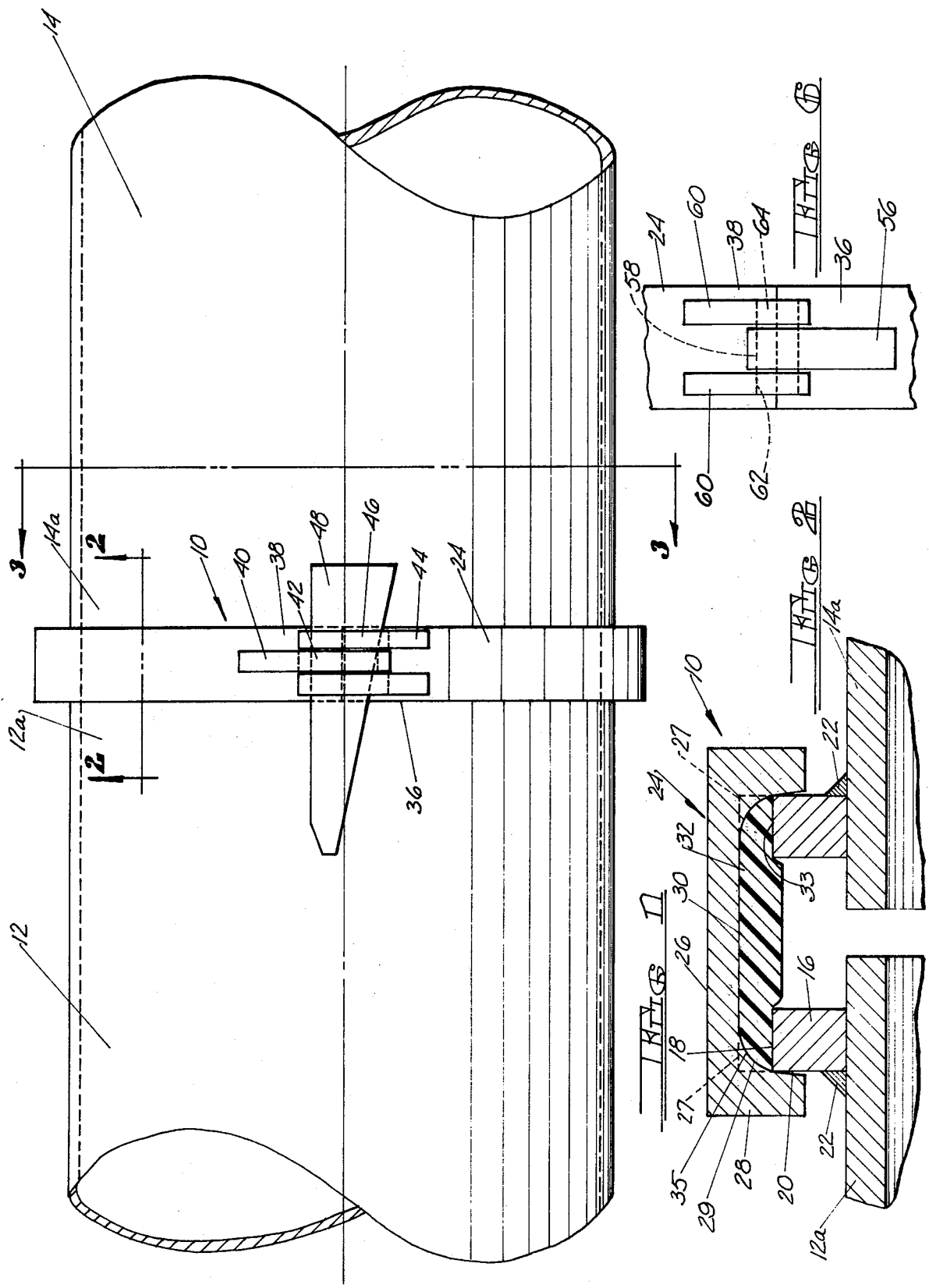

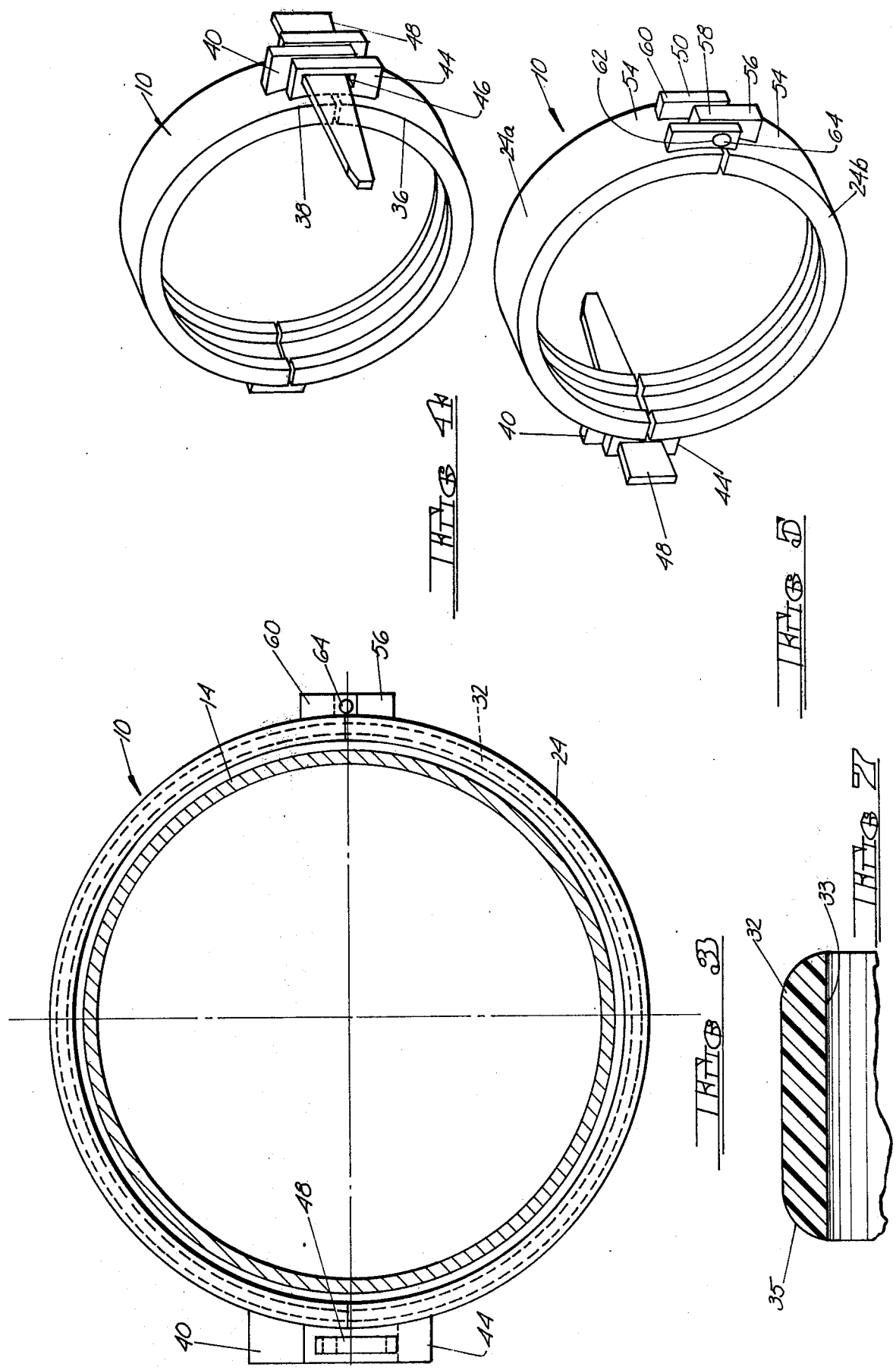

PIPE COUPLING

BACKGROUND OF THE INVENTION

1. Field of the Invention

The invention relates to a pipe coupling and more particularly to an easily installed and inexpensive pipe coupling which will provide a leak tight joint for pipe operating under low to intermediate pressures.

2. Description of the Prior Art

The prior art has long sought to develop an easily installed, inexpensive coupling for joining pressure pipe sections which will provide a leak tight coupling for use with low and intermediate pressures, a coupling that is not only quickly installed but easily removed and re-installed with little or no replacement of coupling components, a strong, inexpensive coupling for use in harsh atmospheres and climatic conditions, a coupling which compensates for longitudinal thrust connection of pipe sections to eliminate the need for thrust blocks, etc., and a coupling which allows a limited amount of joint rotation and longitudinal pipe contraction/expansion. However, the prior art has generally been unsuccessful in such attempts. For example, while the aforementioned attributes are desirable in a number of pipe coupling applications, prior art couplings do not provide all of these attributes and those that do provide some of these attributes, are quite expensive. Additionally, typical prior art couplings are for the most part special application, highly fabricated items, and are, therefore, extremely expensive to manufacture. Furthermore, such specialized application couplings are incapable of quick installation.

SUMMARY OF THE INVENTION

The present invention provides a coupling means for joining two lengths of pipe arranged end-to-end for connection one to the other. Each of the pipe lengths is provided with a continuous, circumferential retainer ring at the juxtaposed ends for pipe end connection purposes. The retainer rings are of substantially rectangular cross section so as to provide therewith a peripheral flat circumferential bearing surface thereon and a substantially radially extending circumferential shoulder facing away from the juxtaposed ends.

Coupling means overlie and engage the retainer rings. The coupling means comprises at least one band of generally U-shaped cross section having a wide base portion and in-turned legs joining the pipe ends. The legs of the band engage the circumferential shoulders of the retainer rings and the base of the band has a width somewhat greater than the combined width of the two pipe retainer rings to be connected. The legs and base of the band form a gasket receiving groove therebetween. When the band is assembled, the legs thereof have an inside diameter slightly greater than the outside diameter of the pipe and are adapted to overlie same.

A gasket is positioned so as to form a seal between the retainer rings and the band. In one embodiment the gasket is positioned in the gasket receiving groove of the band and is retained laterally by the legs of the band. The gasket is provided with a sealing portion which engages the peripheral bearing surface portion of each of the retainer rings. In another embodiment the gasket engages radial bearing surfaces of the retainer rings and a seal is affected when the band compresses the gasket into the spacing between the retainer rings.

One of the free ends of the band is provided with a single lug having an aperture therethrough and the other of the free ends is provided with a pair of spaced lugs having aligned apertures therethrough. The single lug extends between the spaced pair of lugs with its respective aperture in substantial alignment with the aligned apertures of the spaced lugs when the free ends approach or substantially abut each other. Key means are provided to be snugly received within the apertures of the lugs when the free ends approach or substantially abut so as to secure the lugs together and tighten the coupling means about the retainer rings so as to provide a leak tight joint.

In a preferred embodiment the coupling band is made up of two segments joined together by hinge means. In still another preferred embodiment the key means is wedge shaped. Finally, the gasket may comprise a flat rubber gasket.

The pipe lengths to be joined may comprise seamless pipe, seam welded pipe, plastic pipe, corrugated pipe, concrete pipe, and composite pipe.

BRIEF DESCRIPTION OF THE DRAWINGS

FIG. 1 is a plan view of a pipe joint incorporating the coupling of the present invention.

FIG. 2 is a fragmentary, cross section view taken on the line 2—2 of FIG. 1.

FIG. 3 is a cross sectional view taken on the line 3—3 of FIG. 1.

FIG. 4 is a perspective view of the coupling of the present invention showing the key means adapted to be received within the apertures of the lugs.

FIG. 5 is a view similar to FIG. 4 showing the hinge means joining the coupling band when it is made up of two segments.

FIG. 6 is a fragmentary plan view of the coupling showing the hinge means.

FIG. 7 is a fragmentary cross sectional view through the sealing gasket shown in FIGS. 1 through 3 when in its uncompressed position.

DESCRIPTION OF THE PREFERRED EMBODIMENTS

Figure 8:
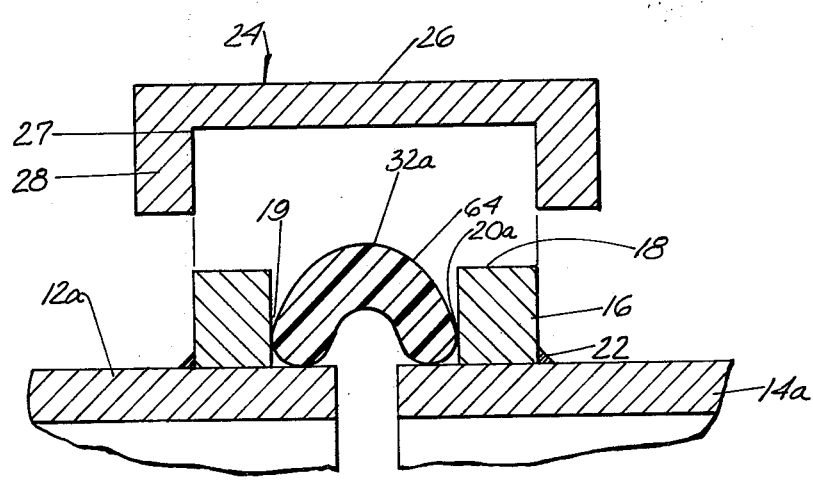
FIG. 8 is a cross sectional view similar to FIG. 2 showing an alternative gasket in place before the coupling means is tightened.

Referring to the drawings and particularly to FIGS. 1 through 3, the coupling assembly incorporating the principles of the present invention is generally indicated at 10. More particularly, the coupling assembly 10 is specifically desirable for use on thin wall pipe having a diameter greater than 12 inches, although it may be used on smaller diameter pipe.

The coupling assembly 10 is used to join two lengths of pipe 12 and 14 arranged end-to-end for connection one to another. Each of the pipe lengths 12 and 14 is provided with a continuous, circumferential, retainer ring 16 thereon at the juxtaposed ends 12a, 14a for pipe connection purposes. The retainer rings 16 are of substantially rectangular cross section so as to provide a peripheral flat circumferential bearing surface 18 thereon and a substantially radially extending circumferential shoulder 20 facing away from the juxtaposed pipe ends 12a, 14a.

As shown in the drawings, the retaining ring 16 is secured to the pipe ends 12a, 14a by means of a suitable circumferential weld bead 22. It will, of course be understood that the weld bead 22 must be continuous completely around the pipe 12, 14 to preclude leakage between the surface of the pipe 12, 14 and the inside diameter of the retainer rings 16.

It will, of course, be understood that the lengths of pipe 12 and 14 to be joined may comprise any suitable diameter pipe, such as, for example, seamless pipe, straight and helically seam welded pipe, plastic pipe, concrete pipe, corrugated pipe and composite pipe. If the lengths of pipe 12 and 14 are plastic pipe, the large diameter end portions 16 are preferably also plastic and a plastic adhesive is utilized to bond the retainer rings 16 to their respective pipe lengths 12, 14. For concrete pipe, concrete retainer rings 16 are prefabricated integral with the lengths of pipe 12 and 14 at the time of manufacture. Alternatively, thick walled concrete pipe lengths 12 and 14 can be provided with annular grooves therein made into the pipe ends 12a, 14a. Each of grooves receives a retainer ring 16 such as metal, plastic or rubber. If the lengths of pipe 12 and 14 to be joined are corrugated, a metal retainer ring 16 can be made so as to mate with the corrugations. Alternatively, the pipe ends 12a, 14a of the lengths of corrugated pipe 12, 14 can be made smooth and the retainer rings 16 can be welded thereto as shown in the drawings. If the lengths of pipe 12 and 14 to be joined are helical butt welded spiral pipe, the retainer rings 16 are obtained in sizes for the appropriate diameter pipe 12, 14 so as to be fitted over the pipe ends 12a, 14a, but yet fit as snugly as possible around the outside diameter of the pipe 12, 14. For plastic concrete, seamless pipe, etc., this is no problem since the outside diameter of the pipe 12, 14 is smooth. However, for straight seam or helical seam butt welded pipe, the weld seam protrudes slightly from the surface of the pipe 12, 14, necessitating that the ends 12a, 14a thereof have the weld bead smooth, such as by grinding, so that the retainer rings 16 will fit more snugly.

As will be seen from the drawings, the coupling means or coupling assembly 10 overlies and engages the retainer rings 16. The coupling assembly 10 comprises at least one band 24 of generally U-shaped cross section having a wide base portion 26 and in-turned legs 28 joining the pipe ends 12a, 14a. The legs 28 of the band 24 engage the circumferential shoulders 20 of the retainer rings 16. The base portion 26 of the band 24 is provided with a width somewhat greater than the combined width of the retainer rings 16 of the two pipes 12, 14 to be connected. The legs 28 and the base 26 of the band 24 form a gasket receiving groove 30 therebetween. The legs 28 of the band 24 when assembled have an inside diameter slightly greater than the outside diameter of the lengths of pipe 12, 14 to be joined.

The inside surface of each leg 28 of the band 24 may join the inside surface of the base portion 26 thereof either at a right angle 27 or in a gentle curve 29, as best seen in FIG. 2. The same is true for the upper corners 35 of the gasket 32, which as shown in FIG. 2, corresponds generally to the gentle curve 29 of the band 24.

A gasket 32 is positioned in the gasket receiving groove 30 of the band 24. The gasket 32 is retained laterally by the legs 28 and is provided with a sealing portion 33 which engages the peripheral bearing surface portion 18 of each of the retaining rings. In practice, it has been found that good results are obtained when the gasket 32 comprises a flat rubber gasket having a flat sealing surface and made of a material — SRB, 50 durometer, as best seen in FIG. 7.

As best seen in FIGS. 1, 4 and 5, the band 24 is provided with a pair of free ends 36, 38 adapted to approach or to substantially abut each other. One of the free ends 38 is provided with a single lug 40 having an aperture 42 therethrough. The other of the free ends 36 is provided with a pair of spaced lugs 44 having aligned apertures 46 therethrough. As can be seen, the single lug 40 extends between the spaced pair of lugs 44 with its respective aperture 42 in substantial alightment with the aligned apertures 46 of the spaced lugs 44 when the free ends 36 and 38 approach or substantially abut each other.

Key means 48 is adapted to be snugly received within the apertures 42, 46 of the lugs 40, 44 so as to secure the lugs 40, 44 together and tighten the coupling assembly 10 about the retainer rings 16 of the pipe ends 12a, 14a so as to provide a leak tight joint when the flat sealing portion 33 of the gasket 32 engages the peripheral bearing surface portion 18 of each of the retaining rings 16, as best seen in FIG. 2. In practice it has been found that the key means 48 is preferably wedge shaped.

Figure 9:
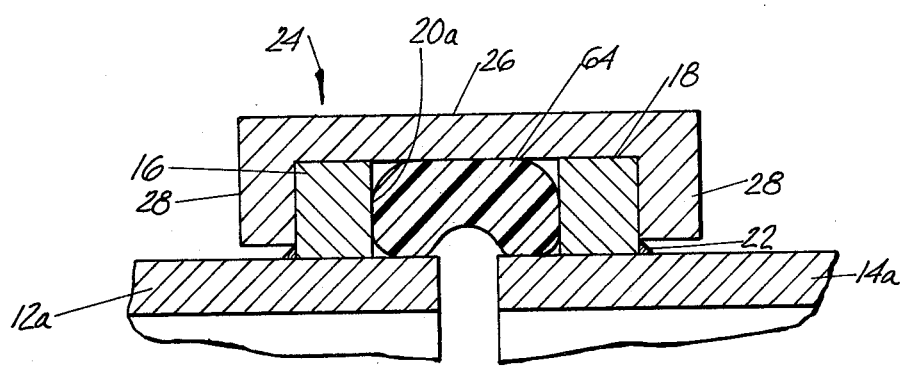
FIG. 9 is a cross sectional view similar to FIG. 8 after the coupling means has been tightened.
Figure 10:
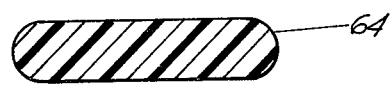
FIG. 10 is a fragmentary cross sectional view similar to FIG. 7 showing the alternative gasket of FIGS. 8 and 9 in the uninstalled position.

An alternative gasket 64 is shown in FIGS. 8 through 10. In FIG. 10 the gasket 64 is shown in its uninstalled position. FIGS. 8 and 9 show the gasket 64 in place before the coupling means 24 is tightened and after the coupling means 24 is tightened, respectively. As can be seen, the gasket 64 engages the radial bearing surfaces 19 of the retaining rings 16. The seal is affected when the band 24 compresses the gasket 64 into the spacing between the two retainer rings 16.

It will, of course, be understood that the coupling band 24 of the coupling assembly 10 of the present invention may comprise at least one band; however, the coupling band 24 may also be made up of two segments 24a, 24b joined together by hinge means 50. Whether or not the coupling band 24 is segmented depends primarily on its thickness, which effects its stiffness, and depends primarily on the pressures contemplated in the pipes 12, 14 to be joined. For example, in lower pressure applications, a thinner gauge band 24 may be satisfactory. For installation, the thinner gauge band 24 can be spread without requiring a hinge means 50. For higher pressures, bands 24 of thicker gauges may be required, and such bands 24 may require one or more hinge means 50. The free ends 52 and 54 of the segmented band 24a, 24b, respectively, to be joined by the hinge means 50 approach or substantially abut each other. One of the free ends 54 is provided with a single lug 56 having an aperture 58 therethrough. The other of the free ends 52 is provided with a pair of spaced lugs 60 having aligned apertures 62 therethrough. The single lug 56 extends between the spaced pair of lugs 60 with its respective aperture 58 in alignment with the aligned apertures 62 of the spaced lugs 60 when the free ends 52 and 54 approach or substantially abut each other. A suitable pin 64 or other means is fit through the aligned apertures 58 and 62 and provides the hinge around which the segments 24a and 24b may pivot.

It will be readily seen that the coupling assembly 10 of the present invention provides a leak tight joint for joining lengths of pipe of varying diameter. The coupling assembly 10 is easily installed and inexpensive to manufacture. The band 24 locks over the retaining rings 16 of adjacent pipe sections 12, 14 to restrain these pipe sections longitudinally, while at the same time it clamps the flat rubber gasket tightly against the bearing surfaces 18 of the retainer rings 16. The coupling assembly 10 is inexpensive and provides quick installation to achieve a pressure tight coupling. It accommodates small amounts of lateral pipe movement as well as small amounts of pipe axis deflection. The coupling assembly 10 may be made from conventional materials. Finally, it will be noted that the coupling assembly 10 provides pipe end restraint.

The invention may be embodied in other specific forms without departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein. For example, the size and spacing of the retaining rings 16 may be altered as necessary. Additionally, the depth of the U-shaped band 24 may be altered to provide for various gasket thicknesses or shapes. Also, increasing the depth of the section of the band 24 and, therefore, the bite over the retaining rings 16, provides additional pipe end restraint control.

What is claimed and desired to be secured by Letters Patent is:

1. A pipe joint comprising, in combination:
   (a) two lengths of thin wall, pipe arranged end-to-end for connection one to the other but providing a gap therebetween to allow for longitudinal movement thereof, each of said pipe lengths having a continuous, circumferential, retainer ring thereon recessed from the juxtaposed ends for pipe end connection purposes to allow longitudinal movement of said pipe lengths at said pipe joint but limit the amount of angular movement of said pipe lengths to prevent leakage, each said retainer ring having an inside diameter substantially contiguous and continuously integral with the outside diameter of its respective pipe length and continuously secured thereto, said retainer rings being of substantially rectangular cross section, whereby to provide therewith a peripheral flat circumferential bearing surface thereon, a substantially radially extending circumferential shoulder facing away from said juxtaposed ends, and a substantially radially extending circumferential bearing surface facing toward said juxtaposed ends;
   (b) coupling means overlying and engaging said retainer rings which is yieldable and flexible during installation and thereafter allows for rotational and lateral movement of said pipe lengths comprising at least one thin band of generally U-shaped cross section having a wide base portion and in-turned legs joining said pipe ends to allow for longitudinal movement of said pipe lengths, the legs of said band engaging said circumferential shoulders of said retainer rings, and the base of said bond having a width somewhat greater than the combined width of said two pipe retainer rings to be connected, said legs of said band when assembled having an inside diameter slightly greater than the outside diameter of said pipe and adapted to overlie same,
   (c) gasket means so positioned as to form a seal between said retainer rings and said band;
   (d) said band having a pair of free ends adapted to approach or substantially abut each other, one of said free ends being provided with a single lug having an aperture therethrough and the other of said free ends being provided with a pair of spaced lugs having aligned apertures therethrough, said single lug extending between said spaced pair of lugs with its respective aperture in substantial alignment with the aligned apertures of said spaced lugs when said free end approach or substantially abut each other;
   (e) key means adapted to be snugly received within said apertures of said lugs when said free end approach or substantially abut each other;
   whereby to secure said lugs together and tighten said coupling means about said retainer rings so as to provide a leak tight joint.

2. The pipe joint according to claim 1, wherein said legs and said base of said band form a gasket receiving groove therebetween and said gasket means is positioned in said gasket receiving groove, retained laterally by said legs and provided with a sealing portion engaging said peripheral bearing portion of each said retainer rings.

3. The pipe joint according to claim 1, wherein said gasket engages radial bearing surfaces of said retainer rings and a seal is affected when said band compresses said gasket into the spacing between said retainer rings.

4. The pipe joint according to claim 1, wherein the inside surface of each said leg of said band is joined to the inside surface of said base portion thereof at a right angle.

5. The pipe joint according to claim 4, wherein the upper corners of said gasket means correspond generally to said to said right angles of said band.

6. The pipe joint according to claim 1, wherein the inside surface of each said leg of said band is joined to the inside surface of said base portion thereof in a gentle curve.

7. The pipe joint according to claim 6, wherein the upper corners of said gasket means correspond generally to said gentle curves of said band.

8. The pipe joint according to claim 1, wherein said coupling band is made up of two segments joined together by hinge means.

9. The pipe joint according to claim 1, wherein said key means is wedge shaped.

10. The pipe joint according to claim 1, wherein said gasket is a flat rubber gasket.

* * * * *

UNITED STATES PATENT OFFICE
CERTIFICATE OF CORRECTION

Patent No. 4,147,383      Dated April 3, 1979

Inventor(s) James C. Schluter

It is certified that error appears in the above-identified patent and that said Letters Patent are hereby corrected as shown below:

Assignee: Armco Steel Corporation
Middletown, Ohio

Signed and Sealed this

Twenty-sixth Day of June 1979

[SEAL]

Attest:

RUTH C. MASON
*Attesting Officer*

DONALD W. BANNER
*Commissioner of Patents and Trademarks*